(12) United States Patent
Miyazaki et al.

(10) Patent No.: US 9,168,605 B2
(45) Date of Patent: Oct. 27, 2015

(54) SOLDERING ASSEMBLY FOR DETACHABLE TIP

(71) Applicant: Hakko Corporation, Osaka (JP)

(72) Inventors: Mitsuhiko Miyazaki, Osaka (JP); Toshikazu Mochizuki, Osaka (JP); Aiko Wakamatsu, Osaka (JP)

(73) Assignee: Hakko Corporation, Osaka, Osaka (JP)

( * ) Notice: Subject to any disclaimer, the term of this patent is extended or adjusted under 35 U.S.C. 154(b) by 0 days.

(21) Appl. No.: 13/689,420

(22) Filed: Nov. 29, 2012

(65) Prior Publication Data

US 2013/0270324 A1    Oct. 17, 2013

Related U.S. Application Data

(60) Provisional application No. 61/625,500, filed on Apr. 17, 2012.

(51) Int. Cl.
*B23K 3/02* (2006.01)
*B23K 3/03* (2006.01)

(52) U.S. Cl.
CPC . *B23K 3/02* (2013.01); *B23K 3/026* (2013.01); *B23K 3/0369* (2013.01)

(58) Field of Classification Search
CPC ..... B23K 3/0369; B23K 3/0361; B23K 3/026
USPC ........ 219/229–231, 238–239; 228/51, 54, 55; 403/348, 349
See application file for complete search history.

(56) References Cited

U.S. PATENT DOCUMENTS

| | | | | |
|---|---|---|---|---|
| 925,056 | A * | 6/1909 | Aller | 219/238 |
| 1,494,859 | A * | 5/1924 | Miller et al. | 279/93 |
| 2,062,940 | A | 12/1936 | Samuels | |
| 2,416,936 | A * | 3/1947 | McKinley | 219/230 |
| 3,393,857 | A * | 7/1968 | Taylor, Jr. et al. | 228/55 |
| 3,423,781 | A * | 1/1969 | Henson | 15/145 |
| 3,484,033 | A * | 12/1969 | Sachs | 228/51 |
| 3,963,361 | A * | 6/1976 | Schenk | 403/255 |
| 4,082,940 | A * | 4/1978 | Knowles et al. | 219/239 |
| 4,136,275 | A * | 1/1979 | McCullough | 219/230 |
| 4,459,785 | A * | 7/1984 | Zimmer | 451/398 |
| 4,941,846 | A * | 7/1990 | Guimond et al. | 439/578 |
| 5,059,769 | A | 10/1991 | Fortune | |
| 5,248,076 | A * | 9/1993 | Eisele et al. | 228/54 |
| 5,464,300 | A * | 11/1995 | Crainich | 403/322.1 |
| 5,741,084 | A * | 4/1998 | Del Rio et al. | 403/349 |
| 5,837,973 | A * | 11/1998 | Tamura | 219/241 |
| 6,147,325 | A * | 11/2000 | Eisele | 219/229 |
| 6,215,104 | B1 * | 4/2001 | Kurpiela et al. | 219/238 |

(Continued)

FOREIGN PATENT DOCUMENTS

DE         15 65 515 B1     11/1969
DE         24 12 060 A1      9/1975

(Continued)

*Primary Examiner* — Devang R Patel
*Assistant Examiner* — Carlos Gamino
(74) *Attorney, Agent, or Firm* — Squire Patton Boggs (US) LLP (57) ABSTRACT

A soldering assembly comprises a heater, a lock member, and a bias member. The lock member is moveable relative to the heater, includes a ramp feature, and is configured to receive a tip or a tip holder. The bias member is configured to urge movement of the lock member away from a distal segment of the heater.

28 Claims, 10 Drawing Sheets

(56) References Cited

U.S. PATENT DOCUMENTS

| | | | |
|---|---|---|---|
| 6,619,876 B2* | 9/2003 | Vaitkus et al. | 403/349 |
| 6,679,647 B2* | 1/2004 | Hixon | 403/349 |
| 6,793,114 B2* | 9/2004 | Dunham et al. | 228/51 |
| 7,603,059 B2* | 10/2009 | Marumoto | 399/167 |
| 7,679,032 B2 | 3/2010 | Masaki | |
| 7,807,949 B2 | 10/2010 | Miyazaki | |
| 8,011,848 B2* | 9/2011 | Sockman et al. | 403/348 |
| 8,197,155 B2* | 6/2012 | Noh | 403/348 |
| 8,439,593 B2* | 5/2013 | Slater et al. | 403/361 |
| 8,490,250 B2* | 7/2013 | Lanz | 16/429 |
| 2013/0270324 A1 | 10/2013 | Miyazaki et al. | |

FOREIGN PATENT DOCUMENTS

| | | |
|---|---|---|
| JP | S51-106225 | 8/1976 |
| JP | A 58-132365 | 8/1983 |
| JP | A 7-183655 | 7/1995 |

* cited by examiner

Distal Direction ← → Proximal Direction

SOLDERING ASSEMBLY FOR DETACHABLE TIP

CROSS-REFERENCE TO RELATED APPLICATION

This application claims the benefit of U.S. Provisional Application No. 61/625,500, filed Apr. 17, 2012, which is incorporated herein by reference in its entirety for all purposes.

FIELD OF THE INVENTION

This invention relates generally to a soldering assembly, and more particularly to a soldering assembly for use with or including a detachable tip.

BACKGROUND OF THE INVENTION

Soldering tools are used to manufacture a wide range of products. The working tip of a soldering tool often becomes oxidized and requires replacement. Replacement is usually accomplished by removing the working tip from the soldering tool, which often requires the use of tools and handling of ancillary parts such as nuts and screws. The use of tools and handling of ancillary parts add to manufacturing costs since tools must be procured and extra pieces of the ancillary parts needed in the event of inadvertent loss. Removal of the working tip can also require a person to handle the working tip or parts of the soldering tool which are normally too hot to handle. The person must then wait for the soldering tool to cool down to a safe temperature, which increasing manufacturing down time. Accordingly, there is a need for a soldering assembly that allows for rapid and convenient removal of a working tip.

SUMMARY OF THE INVENTION

Briefly and in general terms, the present invention is directed to a soldering assembly.

In aspects of the present invention, a soldering assembly comprises a heater, a lock member, and a bias member. The heater includes a distal segment. The lock member is moveable relative to the heater, includes a ramp feature, and is configured to receive a tip or a tip holder. The bias member is configured to urge movement of the lock member away from the distal segment of the heater.

In other aspects, the lock member includes a plurality of ramp features configured to receive the tip or the tip holder.

In other aspects, the lock member includes a cylindrical wall, and each of the ramp features includes a ramp surface facing in a proximal direction away from the distal segment of the heater.

In other aspects, the ramp feature is in the form of a slot or a depression formed into the cylindrical wall of the lock member, and the ramp surface is on an edge of the slot or the depression.

In other aspects, the soldering assembly further comprises a soldering tip holder including a distal portion and a proximal portion, the proximal portion configured to engage onto and disengage from the ramp feature of the lock member.

In other aspects, when the proximal portion of the soldering tip holder is engaged onto the ramp feature of the lock member, twisting of the soldering tip holder causes the lock member to work against the bias member and to move towards the distal segment of the heater.

In other aspects, the proximal portion of the soldering tip holder includes a pin, and during the twisting of the soldering tip holder, the pin slides on the ramp feature.

In other aspects, the soldering tip holder includes a hollow tube, the heater extends through the lock member and the hollow tube, and the soldering tip holder is capable of being twisted around a central axis of the heater when the proximal portion of the soldering tip holder is engaged onto the ramp feature of the lock member.

In other aspects, the soldering assembly further comprises a soldering tip including a flange retained within the hollow tube of the soldering tip holder in a manner that causes the soldering tip to press against the distal segment of the heater when the soldering tip holder is twisted around the central axis of the heater.

In other aspects, the soldering assembly further comprises a soldering tip including a distal part and a proximal part, the proximal part configured to engage onto and disengage from the ramp feature of the lock member.

In other aspects, when the proximal part of the soldering tip is engaged onto the ramp feature of the lock member, twisting of the soldering tip causes a part of the lock member to push against the bias member and to move towards the distal segment of the heater.

In other aspects, wherein the proximal part of the soldering tip includes a rib, and during the twisting of the soldering tip, the rib slides on the ramp feature.

In other aspects, wherein the soldering tip is capable of being twisted around a central axis of the heater when the proximal part of the soldering tip is engaged onto the ramp feature of the lock member.

In other aspects, the soldering tip is pulled proximally against the distal segment of the heater when the soldering tip is twisted around the central axis of the heater.

In other aspects, the soldering assembly further comprises an opposing lock member including an opposing ramp feature in sliding contact with the ramp feature of the lock member, wherein the sliding contact is maintained by the bias member.

In other aspects, the lock member includes a distal end segment configured to engage and disengage a soldering iron tip.

In other aspects, the lock member is capable of being rotated relative to the opposing lock member, the distal end segment includes a hook feature coupled to the ramp feature of the lock member, wherein when the lock member is rotated relative to the opposing lock member, the sliding contact between the ramp feature and the opposing ramp feature causes movement of the hook feature relative to the heater from a tip releasing position to a tip securing position.

In other aspects, either one or both of the ramp feature and the opposing ramp feature includes a detent for temporarily holding the hook feature at the tip releasing position.

In other aspects, the movement of the hook feature includes rotational movement relative to the heater and axial movement relative to the heater.

In other aspects, the soldering assembly further comprises the soldering iron tip including a rib, wherein the hook feature is oriented to receive and release the rib when the hook feature is at the tip releasing position, and the hook feature is oriented to engage and retain the rib when the hook feature is at the tip securing position.

The features and advantages of the invention will be more readily understood from the following detailed description which should be read in conjunction with the accompanying drawings.

DETAILED DESCRIPTION OF THE INVENTION

As used herein, the word "soldering" refers to a process, apparatus, assembly, tool or device involving the application and/or removal of molten metal to/from a work piece. A non-limiting example of a molten metal is solder. Non-limiting examples of a work piece are circuit boards and metal objects.

As used herein, the term "soldering iron" refers to a tool used to apply and/or remove molten material to/from a work piece, and encompasses desoldering tools which remove molten metal from a work piece.

The terms "tip", "soldering tip", and "soldering iron tip" are used interchangeably herein and refer to a working tip of a tool used to apply and/or remove molten material to/from a work piece. These terms encompass desoldering tips that remove molten metal from a work piece by suction or by other methods. It is to be understood that one tip can have a configuration that is different than another tip.

As used herein, any term of approximation such as, without limitation, "near", "about", "approximately", "substantially", "essentially" and the like mean that the word or phrase modified by the term of approximation need not be exactly that which is written but may vary from that written description to some extent. The extent to which the description may vary will depend on how great a change can be instituted and have a person of ordinary skill in the art recognize the modified version as still having the properties, characteristics and capabilities of the modified word or phrase. For example and without limitation, a feature that is described as "substantially equal" to a second feature encompasses the features being exactly equal and the features being readily recognized by a person of ordinary skilled in the art as being equal although the features are not exactly equal.

Figure 1:
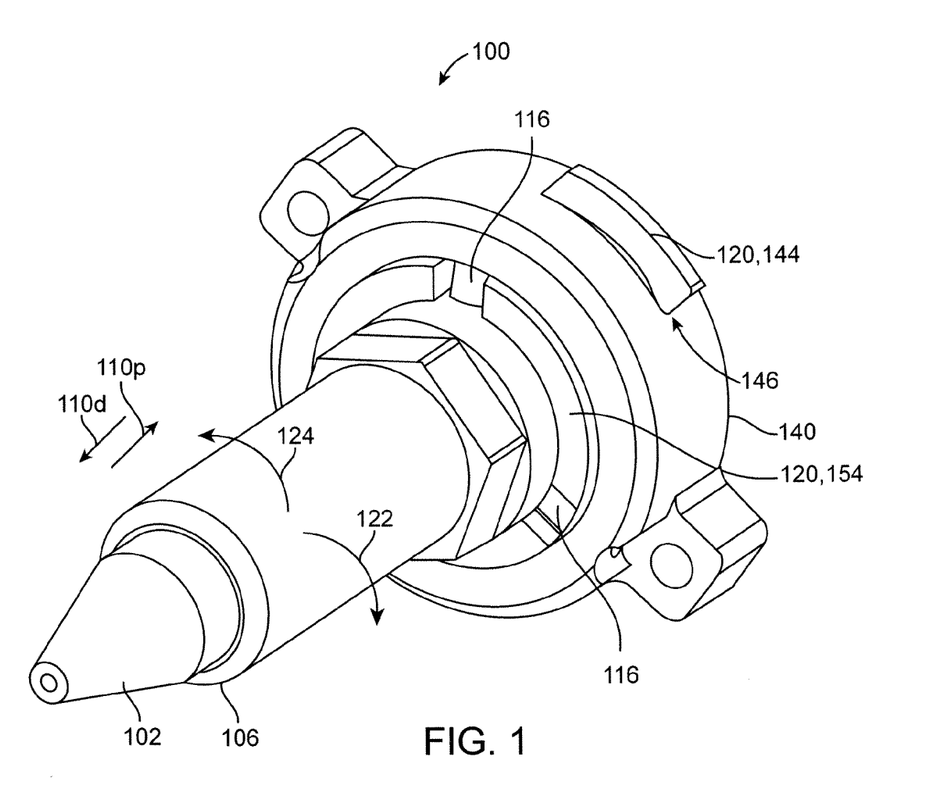
FIG. 1 is perspective view of a soldering assembly with a soldering tip.
Figure 2:
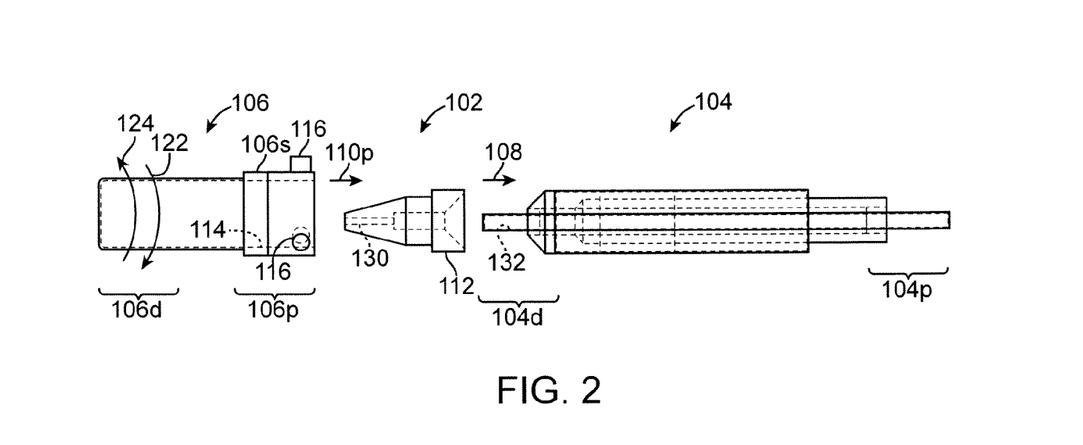
FIG. 2 is an exploded view of parts of a soldering assembly, showing a soldering tip holder, soldering tip, and heater separated from each other.

Referring now in more detail to the exemplary drawings for purposes of illustrating embodiments of the invention, wherein like reference numerals designate corresponding or like elements among the several views, there is shown in FIGS. 1 and 2 soldering assembly 100 with detachable soldering tip 102. Soldering tip 102 is temporarily retained on heater 104 by soldering tip holder 106.

No special tools are needed to mount the soldering tip. To mount soldering tip 102 on heater 104, a user places soldering tip 102 on heater 104 as shown by arrow 108. Next, the user places soldering tip holder 106 over soldering tip 102 and heater 104, as shown by arrow 110p. Distal portion 106d of soldering tip holder 106 engages flange 112 on soldering tip 102 to prevent soldering tip 102 from separating from heater 104. Pins 116 protrude radially outward from outer surface 106s of soldering tip holder 106. Pins 116 are located at proximal portion 106p of soldering tip holder 106 and engage lock member 120 (FIG. 1). Twisting of soldering tip holder 106, in the twisting direction of arrow 122, causes pins 116 to become trapped within lock member 120 so that soldering tip holder 106 and soldering tip 102 are temporarily locked in place.

No special tools are needed to remove the soldering tip. To remove soldering tip 102, soldering tip holder 106 is twisted in the direction of arrow 124 (opposite that of arrow 122) until pins 116 are aligned with openings in lock member 120. Next, soldering tip holder 106 is pulled in a distal direction, as shown by arrow 110d (opposite that of arrow 110p) so that distal portion 106d of soldering tip holder 106 disengages flange 112 on soldering tip 102.

In FIGS. 1 and 2, soldering tip 102 and heater 104 are configured for desoldering or for removing solder. Soldering tip 102 and heater 104 include central passageways 130, 132 through which molten solder can be suctioned away from a work piece.

In other embodiments, soldering tip 102 and heater 104 are used to applying solder to a work piece and do not necessarily include central passageways for vacuuming soldering.

Figure 3A:
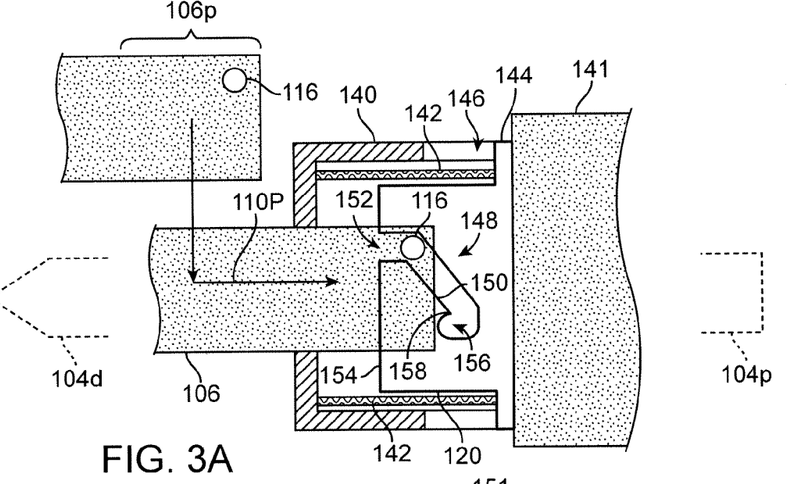
FIGS. 3A-3C are partial cross-sectional diagrams showing relative movement between a soldering tip holder and a lock member.
Figure 3B:
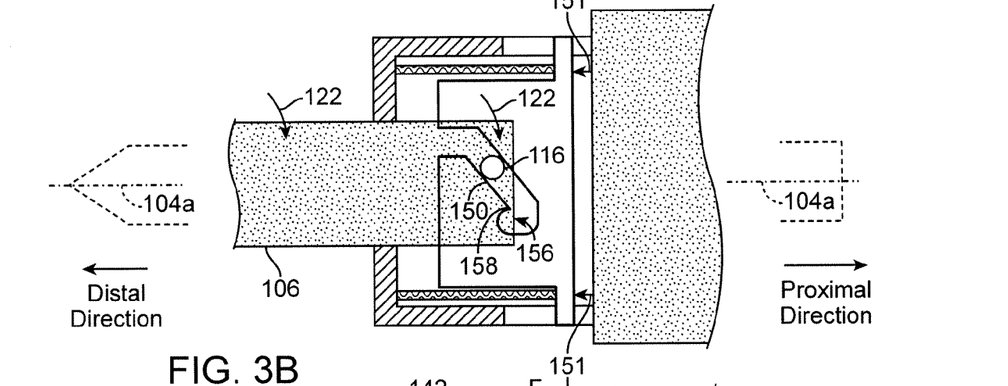
Figure 3C:
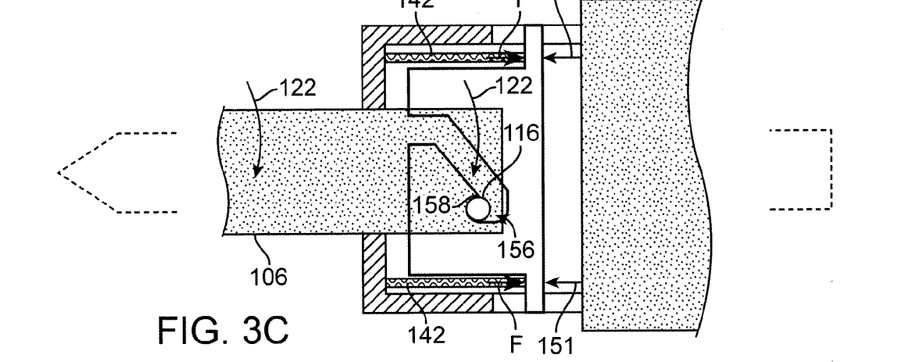

In some embodiments, soldering tip holder 106 and soldering tip 102 are temporarily locked as shown in FIGS. 3A to 3C. Cover 140 contains bias members 142 and lock member 120. Cover 140 is fixedly attached to handle or main housing 141 of soldering assembly 100. Bias members 142 can each be a spring or other resilient device capable of compression and expansion. Bias members 142 are compressed between cover 140 and arms 144 of lock member 120. Arms 144 protrude through holes 146 in cover 140. Hole 146 is configured to prevent rotation of lock member 120 relative to cover 140 while allowing lock member 120 to move axially (arrows 151) as will be described below.

Lock member 120 includes a plurality of ramp features 148 arranged around the cylindrical wall of lock member 120. Soldering tip holder 106 can have a plurality of pins 116, there being one pin 116 for each one of the ramp features 148. Only one pair of ramp feature 148 and pin 116 is shown in FIGS. 3A to 3C for clarity of illustration. Only distal segment 104d and proximal segment 104p of heater 104 are shown (in broken line) for clarity of illustration. It is to be understood that heater 104 extends through soldering tip holder 106, cover 140, and lock member 120, and into handle or main housing 141.

In the illustrated embodiments, pin 116 is a circular post. It will be appreciated that pin 116 can have other shapes, including without limitation a rectangular post or rib.

As shown in FIG. 3A, soldering tip holder 106 is moved by a user in a proximal direction according to arrow 110p so that pin 116 enters opening 152 in cylindrical wall 154 of lock member 120. Thereafter, as shown in FIG. 3B, rotation of soldering tip holder 106 in the direction of arrow 122 around central axis 104a of heater 104 causes pin 116 to slide against ramp surface 150, which pulls lock member 120 in a distal direction and causes lock member 120 to move in the direction of arrows 151. As shown in FIG. 3C, with continued rotation in the direction of arrow 122, lock member 120 moves further in the direction of arrows 151 and pin 116 moves into detent 156 of ramp feature 148. The boundary of detent 156 is formed in part by bump 158. Detent 156 helps to prevent pin 116 from sliding in the reverse direction out of ramp feature 148 after the user releases soldering tip holder 106. With pin 116 located within detent 156, soldering tip holder 106 is temporarily held in a position at which soldering tip holder 106 pulls soldering tip 102 (FIGS. 1 and 2) tightly against distal segment 104d of heater 104 due to expansion forces F exerted by bias members 142 on lock member 120.

Release of soldering tip 102 is performed by reversing the movements of soldering tip holder 106 described above for securing soldering tip 102.

Hole 146 of cover 140 has about the same width as arms 144 of lock member 120 partially protruding out. There is an axial gap between arms 144 and the top edge of holes 146. Therefore, when tip holder 106 is rotated, arms 144 engage the side edges of holes 146 and lock member 120 is prevented from rotating but is forced to move in the axial direction as shown by arrow 151 in FIG. 3B.

In the illustrated embodiments of FIGS. 1 to 3C, ramp feature 148 is in the form of a slot formed through cylindrical walls 154 of lock member 120. The slot is configured to receive pin 116 on soldering tip holder 106.

Figure 4:
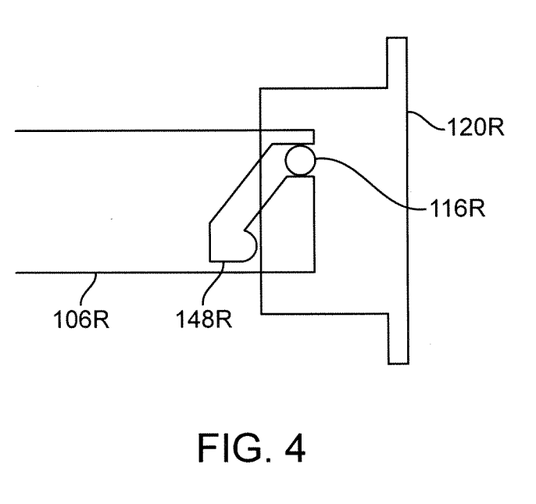
FIG. 4 is a diagram showing a soldering tip holder and a lock member of a soldering assembly.

In alternative embodiments, as shown in FIG. 4, ramp feature 148R, in the form of a slot, is part of soldering tip holder 106R, and pin 116R is part of lock member 120R. The slot in soldering tip holder 106R is configured to receive pin 116R of the lock member. Soldering tip holder 106R and lock member 120R function substantially the same as soldering tip holder 106 and lock member 120 of FIGS. 3A to 3C. Soldering tip holder 106R and lock member 120R can be arranged—in relation to each other and in relation to a soldering tip, cover, heater, and bias members—as described above for soldering tip holder 106 and lock member 120.

FIGS. 5 to 10C show a soldering assembly 200, and portions thereof, that do not need a soldering tip holder to couple soldering tip 202 to a lock member. Soldering tip 202 connects directly to lock member 220. Movements for mounting and removing soldering tip 202 to/from lock member 220 are substantially the same as the above-described movements for mounting and removing soldering tip holder 106 to/from lock member 120 in FIGS. 1-3.

An advantage to of having the soldering tip connect directly to the lock member is that the soldering tip can have virtually any shape and size. Soldering tips with large curves or large working ends can be too large to fit through a soldering tip holder, which can make removal of such soldering tips from the soldering tip holder difficult if not impossible. Replacement of such soldering tips may require replacement of the soldering tip and the soldering tip holder together. This drawback is avoided by having the soldering tip connect directly to the lock member.

Figure 5:
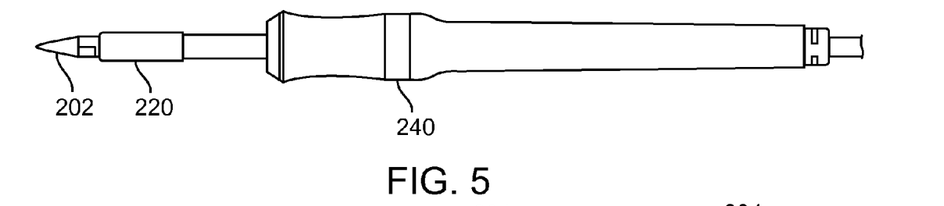
FIG. 5 is a plan view of a soldering assembly with a soldering tip.

FIG. 5 shows soldering tip 202 mounted on lock member 220. Lock member 220 keeps soldering tip 202 in direct thermal contact with heater 204 (FIG. 6), which is hidden from view in FIG. 5.

Figure 6:
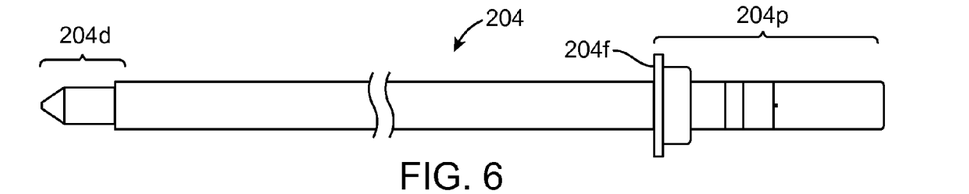
FIG. 6 is a plan view of a heater.
Figure 8:
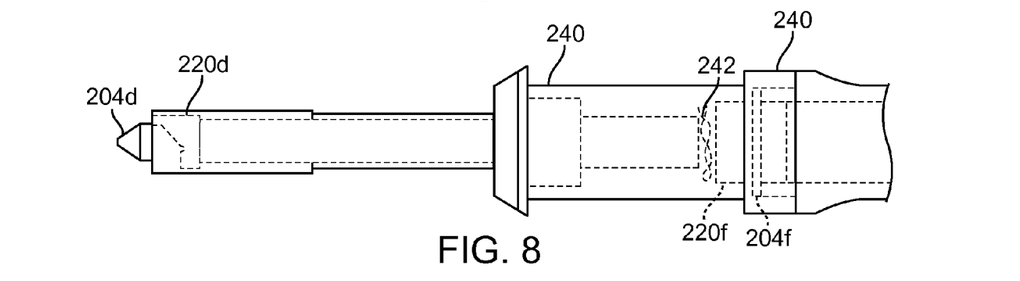
FIG. 8 is an internal plan view showing the heater and the lock member of FIGS. 6 and 7 partially contained in a cover.

FIG. 6 shows heater 204 without parts that would normally be surrounding it or attached to it during use of soldering assembly 200. Heater 204 includes distal segment 204d and proximal segment 204p. Proximal segment 204p includes flange 204f to help fixedly hold heater 204 to cover 240 (FIG. 8). Proximal segment 204p also includes exposed electrical contacts connected to heating elements embedded within heater 204. Distal segment 204d includes a conical outer surface configured to mate with a conical inner surface of soldering tip 202. In other embodiments, the outer surface at distal segment 204d can have other configurations, including without limitation, cylindrical, flat, and spherical.

Figure 7:
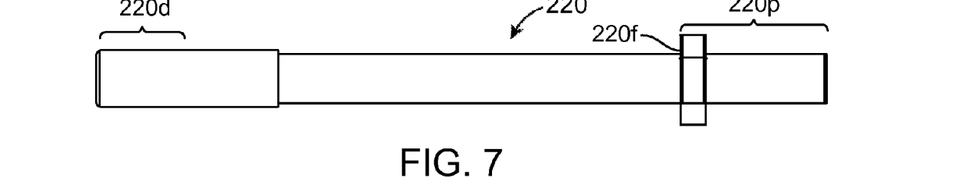
FIG. 7 is a plan view of a lock member.

FIG. 7 shows lock member 220 without parts that would normally be surrounding it or attached to it during use of soldering assembly 200. Lock member 220 includes distal portion 220d and proximal portion 220p. Distal portion 220d is configured to engage onto and disengage from soldering tip 202. Proximal portion 220p includes flange 220f that is configured to engage bias member 242 (FIG. 8).

FIG. 8 shows an internal view of cover 240. Cover 240 includes an internal cavity that contains bias member 242 and flange 220f of lock member 220. Bias member 242 is compressed between a surface of cover 240 and flange 220f. Cover 240 and flange 220f are configured to prevent rotation of lock member 220 relative to cover 240 while allowing lock member 220 to move axially (arrows 251) as will be described below.

Figure 9:
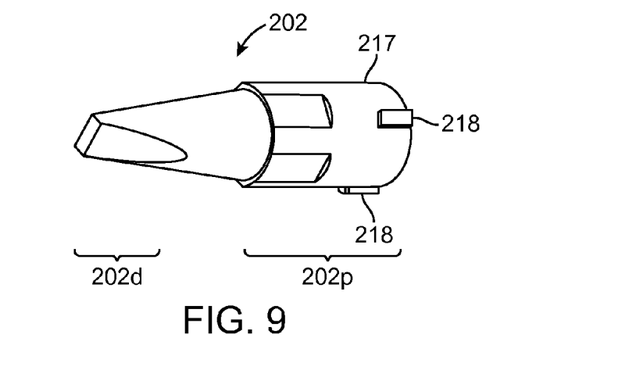
FIG. 9 is a perspective view of a tip.

FIG. 9 shows soldering tip 202 including outer surface 217 and ribs 218 protruding radially outward from outer surface 217. In the illustrated embodiments, rib 218 is rectangular. It will be appreciated that rib 218 can have other shapes, including without limitation a circular post.

Figure 10A:
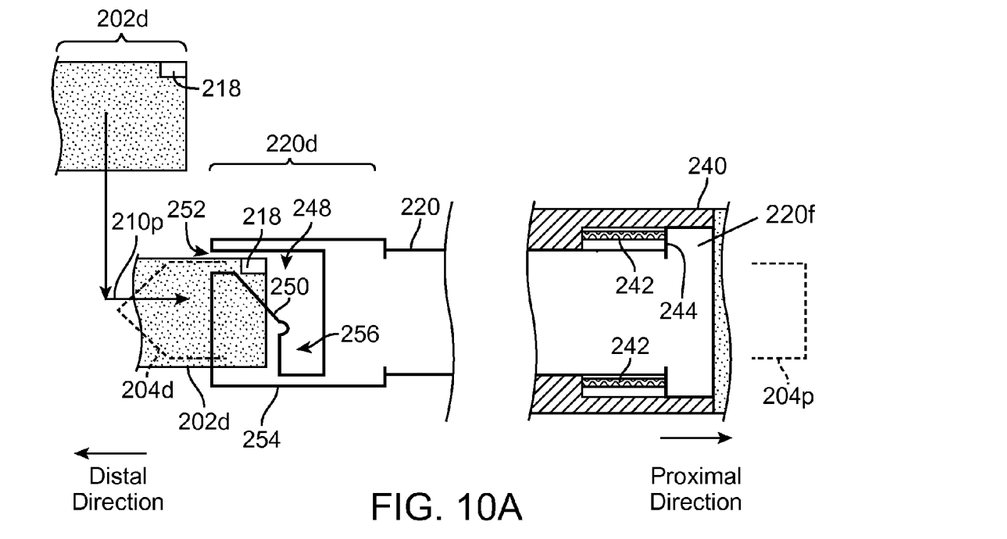
FIGS. 10A-10C are partial internal and partial cross-sectional diagrams showing relative movement between a soldering tip and a lock member.
Figure 10B:
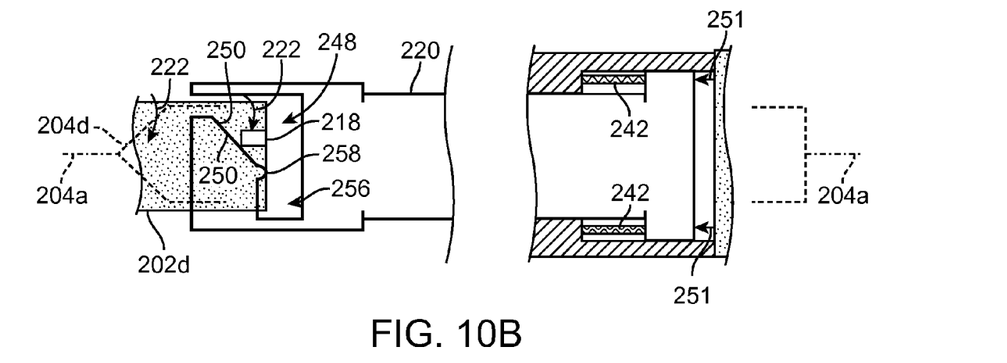
Figure 10C:
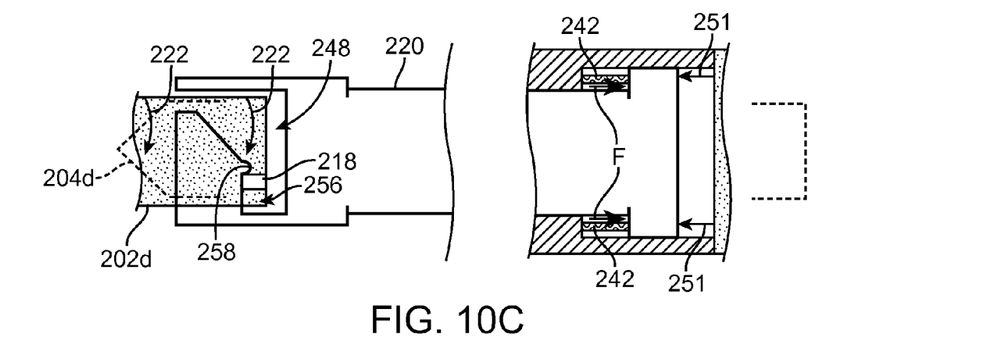

FIGS. 10A to 10C show relationships between soldering tip 202 and distal portion 220d of lock member 220 and relationships between cover 240, bias member 242, and proximal portion 220p of lock member 220.

Lock member 220 includes a plurality of ramp features 248 arranged around the cylindrical wall of lock member 220. Soldering tip 202 has a plurality of ribs 218, there being one rib 218 for each one of the ramp features 248. Only pair of ramp feature 248 and rib 218 is shown in FIGS. 10A-10C for clarity of illustration. Only distal segment 204d and proximal segment 204p of heater 204 are shown (in broken line) for clarity of illustration. It is to be understood that heater 204 extends through lock member 220 and cover 240 and into the base of soldering tip 202.

As shown in FIG. 10A, soldering tip 202 is moved in a proximal direction according to arrow 210p so that rib 218 enters opening 252 in cylindrical wall 254 of lock member 220. Thereafter, as shown in FIG. 10B, rotation of soldering tip 202 in the direction of arrow 222 around central axis 204a of heater 204 causes rib 218 to slide against ramp surface 250, which pulls lock member 220 in a distal direction and causes lock member 220 to move in the direction of arrows 251. As shown in FIG. 10C, with continued rotation in the direction of arrow 222, lock member 220 moves further in the direction of arrows 251 and rib 218 moves into detent 256 of ramp feature 248. The boundary of detent 256 is formed in part by bump 258. Detent 256 helps to prevent rib 218 from sliding in the reverse direction out of ramp feature 248 after the user releases soldering tip 202. With rib 218 located within detent 256, soldering tip 202 is temporarily held in a position at which it is pulled tightly against distal segment 204d of heater 204 due to expansion forces F exerted by bias members 242 on lock member 220.

Flange 220f of lock member 220 is hexagonal, and the part of the cover 240 where flange 220f is located is a hexagonal cavity. Bias member 242 is circular shaped which will fit inside the hexagonal cavity. In this way, when tip 202 is rotated, lock member 202 does not rotate and will move in the axial direction.

FIGS. 11A to 19E show a soldering assembly 300, and portions thereof, that allow for mounting and dismounting of soldering tip 302 to/from a lock member without any need for the user to manipulate, hold, or rotate soldering tip 302. Instead of rotating the soldering tip as in the soldering assembly of FIGS. 10A to 10C, soldering tip 302 can be mounted and dismounted with rotation of only lock member 320.

Figure 11A:
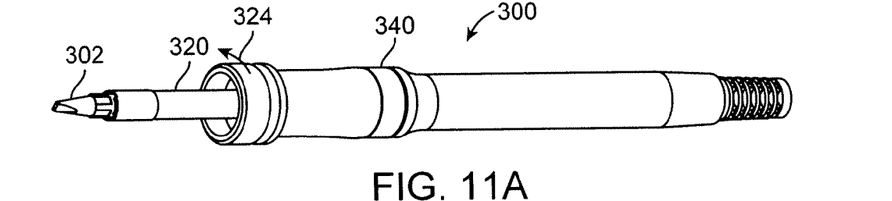
FIGS. 11A-11E are perspective views of a soldering assembly, showing movements for releasing and securing a soldering tip.
Figure 11B:
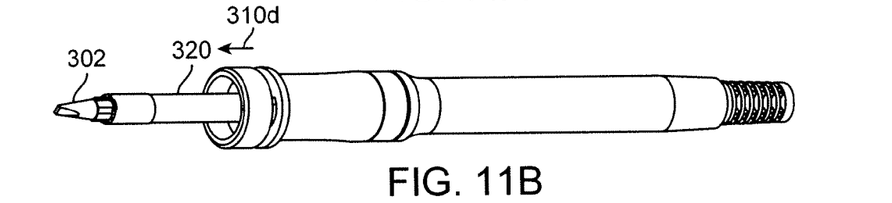

FIG. 11A shows lock member 320 oriented in a securing position at which soldering tip 302 is pulled by lock member 320 onto distal portion 304d (FIG. 12) of the heater. Rotation of knob 321 of lock member 320 in the direction of arrow 324 moves lock member 320 to a releasing position, as shown in FIG. 11B. In the releasing position, lock member 320 has rotated and moved axially in the distal direction of arrow 310d. Soldering tip 302 is free to be pulled or drop away from heater distal portion 304d.

Figure 11C:
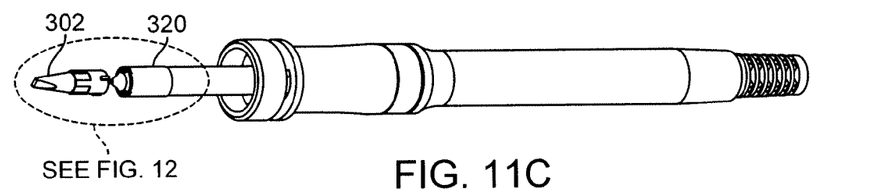

FIG. 11C shows soldering tip 302 after it has pulled or dropped away from heater distal portion 304d. Soldering tip 302 can be pulled by gravity and drop away by its own weight, without any need for the user to touch soldering tip 302. Alternatively, FIG. 11C also shows a replacement soldering tip before it is inserted into lock member 320.

Figure 11D:
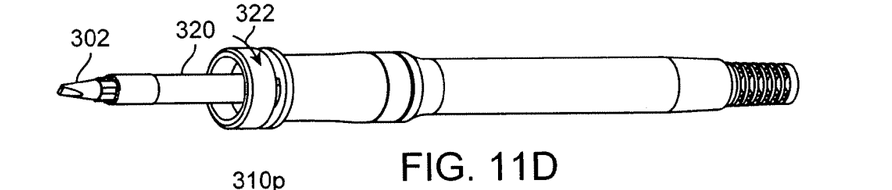
Figure 11E:
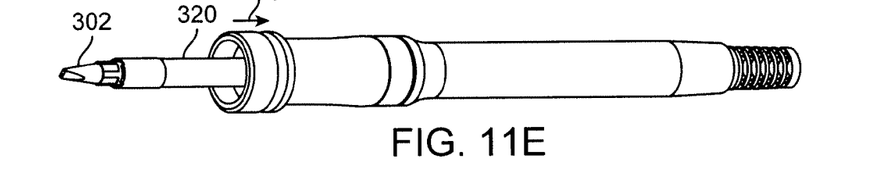

After inserting soldering tip 320 into lock member 320 while in the releasing position shown in FIG. 11D, rotation of knob 321 in the direction of arrow 322 moves lock member 320 to a securing position, as shown in FIG. 11E. In the securing position, lock member 320 has rotated and moved axially in the proximal direction of arrow 310p.

Figure 12:
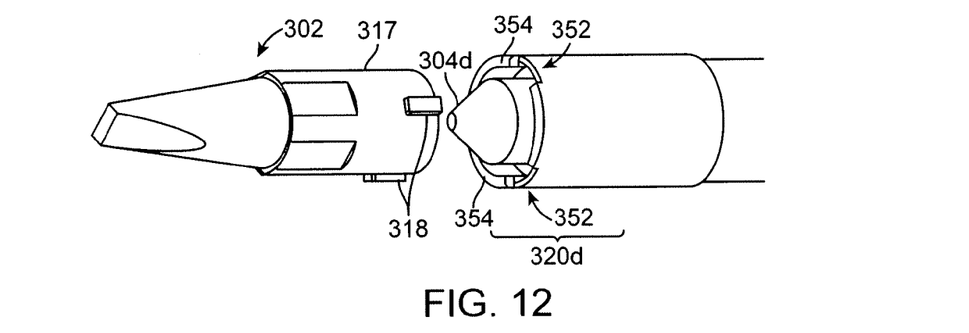
FIG. 12 is a detailed perspective view of a region in FIG. 11C, showing an interface between the soldering tip and a distal portion of a lock member.

FIG. 12 shows an enlarged view of soldering tip 302 and distal portion 320d of lock member 320. Soldering tip 302 includes ribs 318 located at about the distal end of soldering tip 302. Ribs 318 project radially outward from outer surface 317 and are sized to fit within openings 352 in cylindrical wall 354 of lock member 320.

Figure 13:
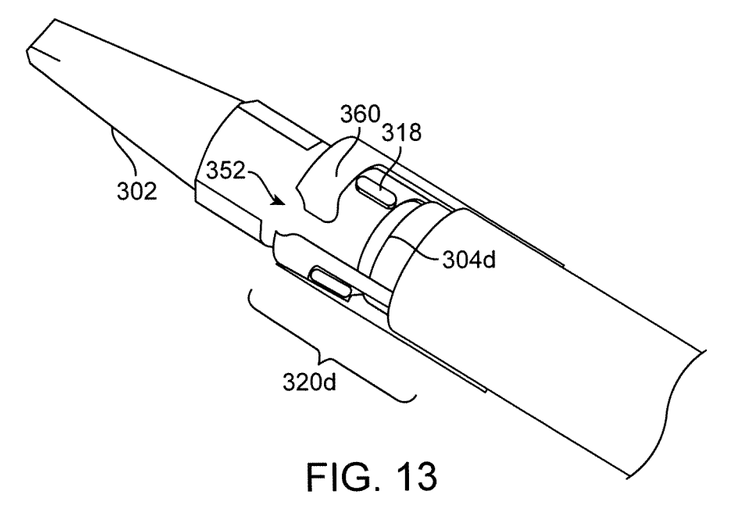
FIG. 13 is a partial internal view of the distal portion of the lock member, showing a hook feature engaging a rib of a soldering tip.

FIG. 13 shows a portion of cylindrical wall 354 removed to show internal features of distal portion 320d of lock member 320. Opening 352 is adjacent to hook feature 360. Lock member 320 is oriented in the securing position. In the securing position, opening 352 has rotated away from rib 318 of soldering tip 302, which traps rib 318 and thereby keeps soldering tip 302 in contact with heater distal portion 304d.

Figure 14:
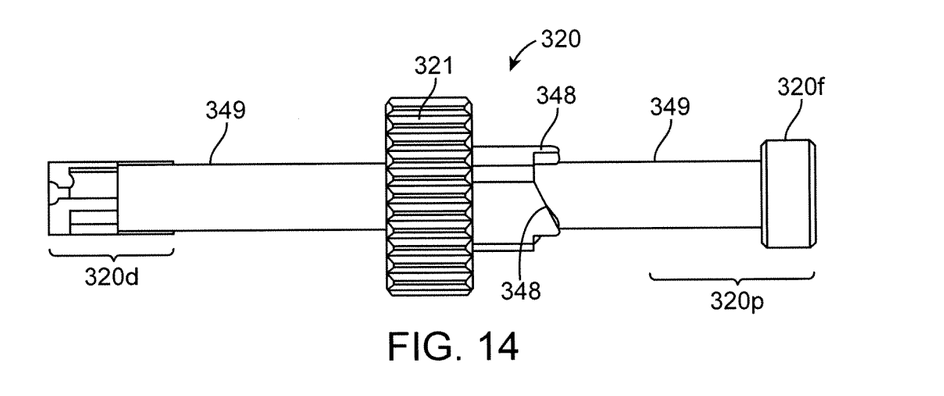
FIG. 14 is a plan view of a lock member.
Figure 18:
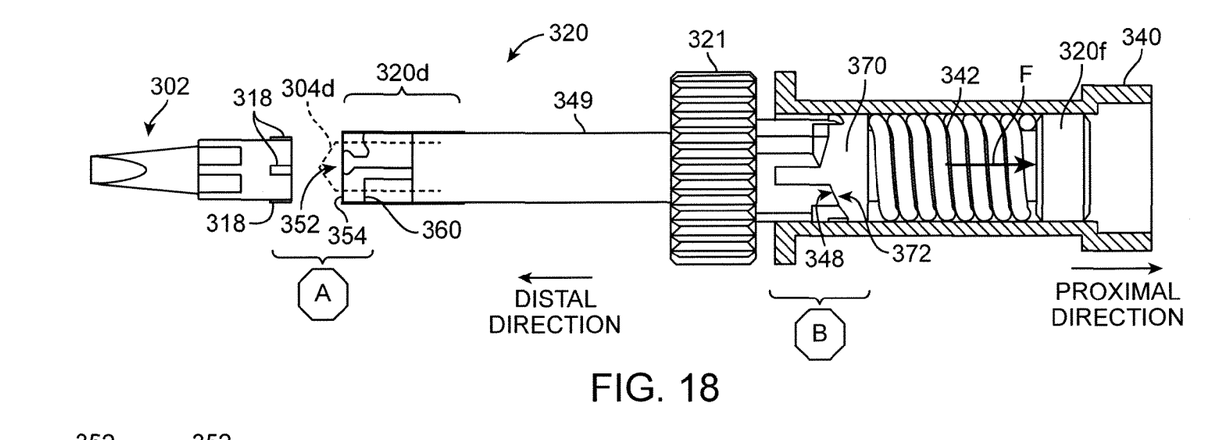
FIG. 18 is a partial internal view, showing an interface (A) between the soldering tip and the hook feature of the lock member, and an interface (B) between a ramp feature of the lock member and an opposing ramp feature of the opposing lock member.

FIG. 14 shows lock member 320, which includes distal portion 320d and proximal portion 320p. Post 349 connects distal portion 320d to proximal portion 320p. Distal portion 320d is configured to engage onto and disengage from soldering tip 302. Proximal portion 320p includes flange 320f configured to engage bias member 342 (FIG. 18). Knob 321 and a plurality of ramp features 348 are located between proximal portion 320p and distal portion 320d. Ramp features 348 are in the form of a depression, as they are a radially inward step to post 349. Three ramp features 348 are arranged circumferentially around post 349, although only two of the ramp features are clearly visible in FIG. 14.

Figure 15:
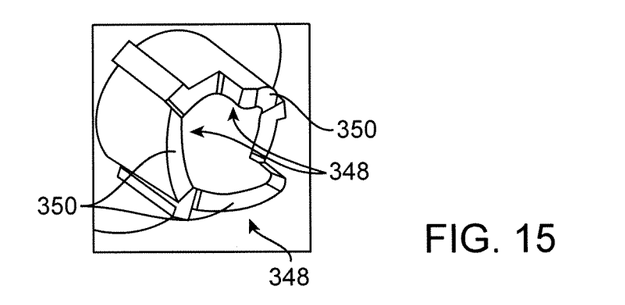
FIG. 15 is a detailed perspective view of a portion of the lock member.

FIG. 15 shows a detailed view of a portion of lock member 320 with post 349 removed in order to show all ramp features 348. Each of the ramp features includes ramp surface 350 that faces in a proximal direction toward flange 320f.

In other embodiments, lock member 320 includes one, two, or more than three ramp features.

Figure 16:
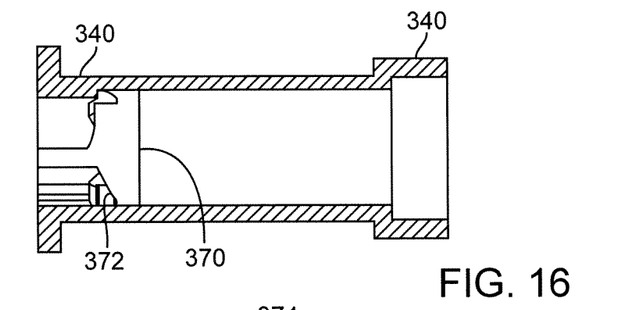
FIG. 16 is a partial internal view of a cover, showing an opposing lock member attached to the cover.

FIG. 16 shows cover 340 that contains opposing lock member 370. Opposing lock member 370 includes a plurality of opposing ramp features 372 which is normally located in contact with and opposition to ramp features 348 of lock member 320.

Figure 17:
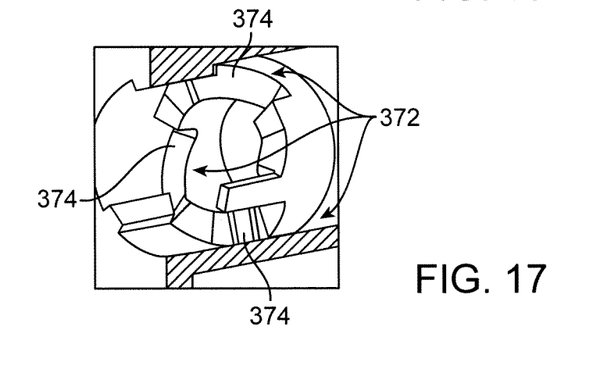
FIG. 17 is a detailed perspective view of the opposing lock member.

FIG. 17 shows a detailed view of opposing lock member 370 with a portion of cover 340 removed. Each opposing ramp feature 372 includes opposing ramp surface 374 that faces in a distal direction. When a user rotates lock member 320, ramp surfaces 350 of lock member 320 slide against opposing ramp surfaces 374.

FIG. 18 shows lock member 320, cover 340, opposing lock member 370, and bias member 342 assembled together. Only distal segment 204d of heater 204 is shown (in broken line) for clarity of illustration. It should be understood that the heater extends through lock member 320, cover 340, opposing lock member 370, and bias member 342.

Bias member 342 is compressed between lock member flange 320f and opposing lock member 370. Post 349 extends through bias member 342 and connects flange 320f to ramp features 348 and hook feature 360 at distal portion 320d of lock member 320. Bias member 342 exerts an expansion force F on flange 320f. Expansion force F is in a proximal direction and is transmitted by post 349 to ramp features 348 and hook feature 360.

Letter (A) designates the interface between soldering tip 302 and hook feature 360 of lock member 320. Letter (B) designates the interface between ramp features 348 of lock member 320 and opposing ramp features 372 of opposing lock member 370.

Figure 19A:
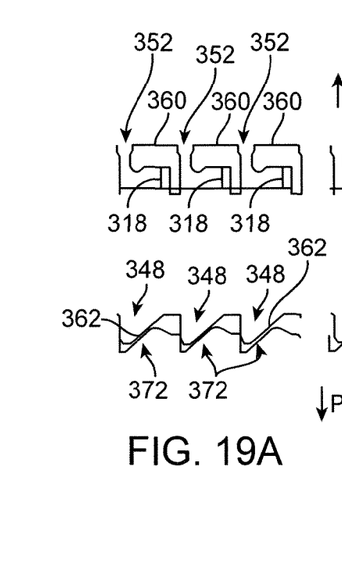
FIGS. 19A-19E are a diagrammatic sequence of movements at interface (B) and corresponding movements at interface (A) for releasing and securing the soldering tip.
Figure 19B:
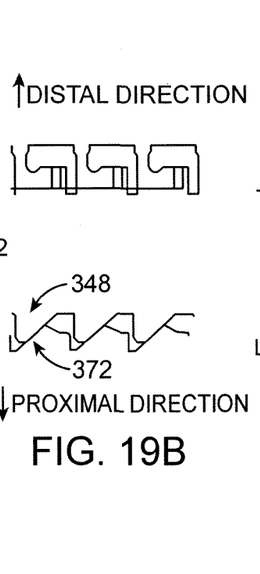
Figure 19C:
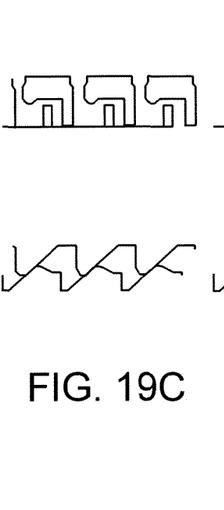
Figures 19D, 19E:
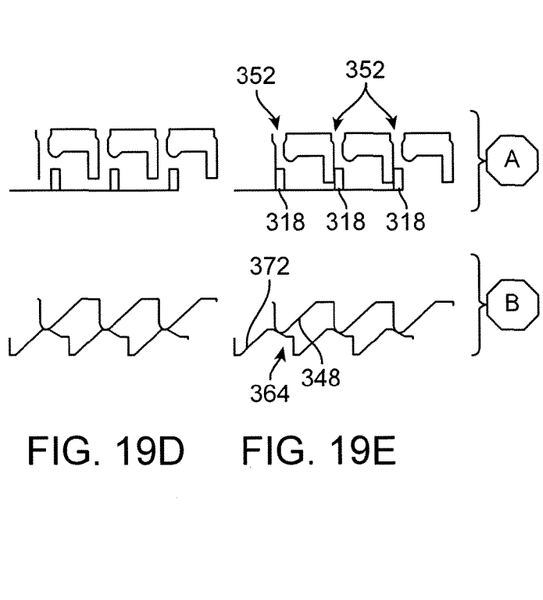

FIGS. 19A to 19E are a diagrammatic sequence of movements at interface (B) and corresponding movements at interface (A) for releasing soldering tip 302. In the reverse direction, FIGS. 19E to 19A are a diagrammatic sequence of movements for securing soldering tip 302. The movements are caused by user rotation of lock member 320, by manipulation of knob 321, relative to cover 340 and opposing lock member 370.

As discussed above, ribs 318 of soldering tip 302 are configured to pass through openings 352 in cylindrical wall 354 of lock member 320. The ability to pass through depends on whether openings 352 and ribs 318 are aligned with each other.

In FIG. 19A, hook features 360 are in a tip securing position. Openings 352 are not aligned with ribs 318, which prevents soldering tip 302 from being released. Due to expansion force F of bias member 342, hook features 360 pull ribs 318 of soldering tip 302 in a distal direction onto distal portion 304d (FIG. 12) of the heater. Expansion force F is transmitted to ribs 318 due to an axial gap 362 between ramp features 348 and opposing ramp features 372.

In FIG. 19E, hook features 360 are in a tip releasing position. Openings 352 are aligned with ribs 318. Hook features 360 are raised in a distal direction so that hook features 360 do not pull ribs 318 proximally. Hook features 360 are kept raised since ramp features 348 have slid up opposing ramp feature 372 to detent 364 on ramp feature 372.

FIGS. 19B, 19C, and 19D show a progression between FIGS. 19A and 19E. Starting from 19A, rotation of knob 321 in order to move hook features 360 to the releasing position is met with resistance due to contact between ramp features 348 and opposing ramp feature 372. Due to the edge profiles of ramp features 348 and opposing ramp feature 372, continued rotation of knob 321 requires ramp features 348 to slide up in a distal direction (see FIGS. 19B to 19D), which is opposed by expansion force F of bias member 342. The edge profile of each opposing ramp feature 372 includes an upward slope having a peak, followed by a downward slope to a substantially flat region. The flat region forms detent 364. Thus when ramp feature 348 slides up opposing ramp feature 372, the whole lock member 320 moves in the distal direction relative to heater 304, cover 340, and opposing ramp feature 372. With expansion force F working in the proximal direction, when ramp feature 348 reaches the detent as in FIG. 19E, hook features 360 of lock member 320 are kept at the tip releasing position.

Figure 20:
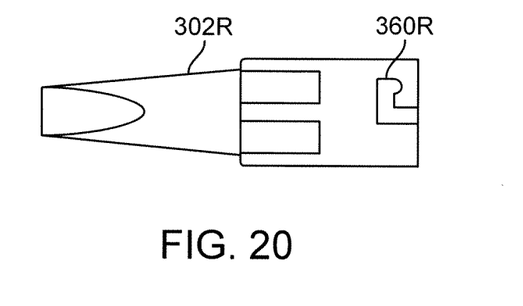
FIG. 20 is a plan view of a soldering tip having a hook feature.

In a reverse embodiment, as shown in FIG. 20, hook feature 360R, in the form of a slot, is part of soldering tip 302R. A radially protruding rib is part of a lock member. The slot in soldering tip 302R is configured to receive the radially protruding rib. Soldering tip 302R and its corresponding ribbed lock member function substantially the same as soldering tip 302 and lock member 320 of FIGS. 11A to 19E. Soldering tip 302R and ribbed lock member can be arranged—in relation to each other and in relation to a cover, ramp features, opposing ramp features, heater, and bias members—as described above for soldering tip 302 and lock member 320.

As shown for example without limitation in FIGS. 3A-3C, 10A-10C, and 18, in some embodiments a soldering assembly comprises heater 104, 204, 304, lock member 120, 220, 320, and bias member 142, 242, 342. Heater 104, 204, 304 includes distal segment 104d, 204d, 304d. Lock member 120, 220, 320 is moveable relative to heater 104, 204, 304 and includes ramp feature 148, 248, 348. The lock member is configured to receive a tip or tip holder. Bias member 142, 242, 342 is configured to urge movement of lock member 120, 220, 320 away from distal segment 104d, 204d, 304d of heater 104, 204, 304.

In some embodiments, lock member 120, 220, 320 includes a plurality of ramp features 148, 248, 348. In some embodiments, the ramp features are configured to receive or engage the tip and or the tip holder.

In some embodiments, lock member 120, 220, 320 includes cylindrical wall 154, 254, 354. Each of the ramp features 148, 248, 348 includes ramp surface 150, 250, 350 facing in a proximal direction away from distal segment 104d, 204d, 304d of heater 104, 204, 304.

In some embodiments, ramp feature 148, 248, 348 is in the form of a slot or a depression formed into cylindrical wall 154, 254, 354 of lock member 120, 220, 320. Ramp surface 150, 250, 350 is on an edge of the slot or the depression.

As shown for example without limitation in FIGS. 2 and 3A-3C, in some embodiments a soldering assembly optionally comprises soldering tip holder 106 including distal portion 106d and proximal portion 106p. Proximal portion 106p is configured to engage onto and disengage from ramp feature 148 of lock member 120.

In some embodiments, when proximal portion 106p of the soldering tip holder is engaged onto ramp feature 148, twisting of soldering tip holder 106 causes lock member 120 to work against bias member 142 and to move towards distal segment 104d of the heater.

In some embodiments, proximal portion 106p of soldering tip holder 106 includes pin 116. During twisting of soldering tip holder 106, pin 116 slides on ramp feature 148.

In some embodiments, soldering tip holder 106 includes hollow tube 114. Heater 104 extends through lock member 120 and hollow tube 114. Soldering tip holder 106 is capable of being twisted around central axis 104a of heater 104 when proximal portion 106p of soldering tip holder 106 is engaged onto ramp feature 148 of lock member 120.

In some embodiments, a soldering assembly optionally comprises soldering tip 102 including flange 112. Flange 112 is retained within hollow tube 114 of soldering tip holder 106 in a manner that causes soldering tip 102 to press against distal segment 104d of heater 104 when soldering tip holder 106 is twisted around central axis 104a of heater 104.

As shown for example without limitation in FIGS. 9 and 10A-10C, in some embodiments a soldering assembly optionally comprises soldering tip 202 including distal part 202d and proximal part 202p. Proximal part 202p is configured to engage onto and disengage from ramp feature 248 of lock member 220.

In some embodiments, when proximal part 202p of soldering tip 202 is engaged onto ramp feature 248, twisting of soldering tip 202 causes arm part 244 of lock member 220 to push against bias member 242 and to move towards distal segment 204d of the heater.

In some embodiments, proximal part 202p of soldering tip 202 includes rib 218. During the twisting of soldering tip 202, rib 218 slides on ramp feature 248.

In some embodiments, soldering tip 202 is capable of being twisted around central axis 204a of the heater when proximal part 202p of soldering tip 202 is engaged onto ramp feature 248.

In some embodiments, soldering tip 202 is pulled proximally against distal segment 204d of the heater when soldering tip 202 is twisted around central axis 204a of the heater.

As shown for example without limitation in FIGS. 18 and 19A-19E, a soldering assembly optionally comprises opposing lock member 370. Opposing lock member 370 includes opposing ramp feature 372 in sliding contact with ramp feature 348 of lock member 320. The sliding contact is maintained by bias member 342.

In some embodiments, lock member 320 includes distal end segment 320d configured to engage and disengage soldering iron tip 302.

In some embodiments, lock member 320 is capable of being rotated relative to opposing lock member 370. Distal end segment 320d includes hook feature 360 coupled to ramp feature 348 of lock member 320. When lock member 320 is rotated relative to opposing lock member 370, the sliding contact between ramp feature 348 and opposing ramp feature 372 causes movement of hook feature 360 relative to heater 304d from a tip releasing position (FIG. 19E) to a tip securing position (FIG. 19A).

In some embodiments, either one or both of ramp feature 348 and opposing ramp 372 feature includes detent 364 for temporarily holding hook feature 360 at the tip releasing position.

In some embodiments, the movement of hook feature 360 includes rotational movement relative to heater 304d and axial movement relative to heater 304d.

In some embodiments, a soldering assembly comprises soldering iron tip 302 including rib 318. Hook feature 360 is oriented to receive and release rib 318 when hook feature 360 is at the tip releasing position. Hook feature 360 is oriented to engage and retain rib 318 when hook feature 360 is at the tip securing position.

In any one or all of the embodiments described above, the heater can include one or more electrical heating coils or electrical heating elements connected to a power source.

In any one or all of the embodiments described above, the bias member can be a leaf spring, helical spring, torsion spring, or other device configured to self-expand after it is compressed.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A soldering assembly comprising:
   a heater;
   a tip removably secured to a distal segment of the heater;
   a cover;
   a bias member inside the cover; and
   a lock member moveable relative to the heater and the cover, the lock member configured to engage the tip or a tip holder holding the tip,
   wherein the lock member includes an arm or a flange, the bias member axially deforms between the cover and the arm or the flange, and the bias member is configured to urge movement of the lock member away from the distal segment of the heater, and wherein the tip is held against the heater by action of the bias member when the lock member engages the tip or the tin holder.

2. The soldering assembly of claim 1, wherein the lock member includes a ramp feature.

3. The soldering assembly of claim 2, wherein the lock member includes a plurality of ramp features configured to receive the tip or the tip holder.

4. The soldering assembly of claim 2, wherein the lock member includes a cylindrical wall, and the ramp feature includes a ramp surface facing in a proximal direction away from the distal segment of the heater.

5. The soldering assembly of claim 4, wherein the ramp feature is a slot or a depression formed into the cylindrical wall of the lock member, and the ramp surface is on an edge of the slot or the depression.

6. The soldering assembly of claim 2, further comprising the tip holder, wherein the tip holder includes a distal portion and a proximal portion, the proximal portion configured to engage onto and disengage from the ramp feature of the lock member.

7. The soldering assembly of claim 6, wherein when the proximal portion of the tip holder is engaged onto the ramp feature of the lock member, twisting of the tip holder causes the lock member to work against the bias member and to move towards the distal segment of the heater.

8. The soldering assembly of claim 7, wherein the proximal portion of the tip holder includes a pin, and during the twisting of the tip holder, the pin slides on the ramp feature.

9. The soldering assembly of claim 2, wherein the tip includes a distal part and a proximal part, the proximal part configured to engage onto and disengage from the ramp feature of the lock member.

10. The soldering assembly of claim 9, wherein when the proximal part of the tip is engaged onto the ramp feature of the lock member, twisting of the tip causes a part of the lock member to work against the bias member and to move towards the distal segment of the heater.

11. The soldering assembly of claim 10, wherein the proximal part of the tip includes a rib, and during the twisting of the tip, the rib slides on the ramp feature.

12. The soldering assembly of claim 2, further comprising an opposing lock member including an opposing ramp feature in sliding contact with the ramp feature of the lock member, wherein the sliding contact is maintained by the bias member.

13. The soldering assembly of claim 12, wherein the lock member includes a distal end segment configured to engage and disengage the tip.

14. The soldering assembly of claim 13, wherein the lock member is capable of being rotated relative to the opposing lock member, the distal end segment includes a hook feature coupled to the ramp feature of the lock member, wherein when the lock member is rotated relative to the opposing lock member, the sliding contact between the ramp feature and the opposing ramp feature causes movement of the hook feature relative to the heater from a tip releasing position to a tip securing position.

15. The soldering assembly of claim 14, wherein either one or both of the ramp feature and the opposing ramp feature includes a detent for temporarily holding the hook feature at the tip releasing position.

16. The soldering assembly of claim 14, wherein the movement of the hook feature includes rotational movement relative to the heater and axial movement relative to the heater.

17. The soldering assembly of claim 14, wherein the tip includes a rib, the hook feature is oriented to receive and release the rib when the hook feature is at the tip releasing position, and the hook feature is oriented to engage and retain the rib when the hook feature is at the tip securing position.

18. The soldering assembly of claim 2, wherein the tip or the tip holder includes a protruding part, the protruding part is a pin or a rib, and ramp feature of the lock member is configured to receive the protruding part.

19. The soldering assembly of 18, wherein the ramp feature includes a detent configured to temporarily hold the protruding part in a tip securing position.

20. The soldering assembly of claim 1, wherein the lock member includes a pin, the tip includes a ramp feature configured to receive the pin.

21. The soldering assembly of claim 2, wherein when twisting the tip or the tip holder received by the ramp feature, the lock member is prevented from twisting and the lock member moves in an axial direction.

22. The soldering assembly of claim 21, wherein the arm of the lock member mates with a hole in the cover to prevent the twisting of the lock member.

23. The soldering assembly of claim 21, wherein the flange of the lock member mates with a cavity in the cover to prevent the twisting of the lock member.

24. The soldering assembly of claim 20, wherein when twisting the tip or the tip holder receiving the pin, the lock member is prevented from twisting and the lock member moves in an axial direction.

25. A soldering assembly comprising:
   a heater;
   a cover;
   a tip removably secured to a distal segment of the heater; and
   a lock member movable relative to the cover, the lock member including a first portion and a second portion, the first portion retained in the cover, the second portion configured to mate with the tip or a tip holder holding the tip, the first portion including an arm or a flange; and a bias member disposed inside the cover at a location between the cover and the arm or the flange, wherein the tip is held against the distal segment of the heater by action of the bias member when the second portion of the lock member is mated with the tip or the tip holder.

26. The soldering assembly of claim 25, wherein the cover forms a part of a soldering iron grip.

27. The soldering assembly of claim 25, wherein the heater is positioned through the cover.

28. The soldering assembly of claim 27, wherein the heater is at least partially disposed within the lock member.

* * * * *

UNITED STATES PATENT AND TRADEMARK OFFICE
CERTIFICATE OF CORRECTION

PATENT NO. : 9,168,605 B2  
APPLICATION NO. : 13/689420  
DATED : October 27, 2015  
INVENTOR(S) : Mitsuhiko Miyazaki et al.

Page 1 of 1

It is certified that error appears in the above-identified patent and that said Letters Patent is hereby corrected as shown below:

In the Claims

Column 11, line 32 at claim 1, last line, replace "tin holder" with --tip holder--.

Signed and Sealed this
Twenty-first Day of June, 2016

Michelle K. Lee
*Director of the United States Patent and Trademark Office*